May 5, 1931. H. F. SNYDER 1,803,981
DRIVING MECHANISM FOR WASHING MACHINES AND THE LIKE
Original Filed June 16, 1921
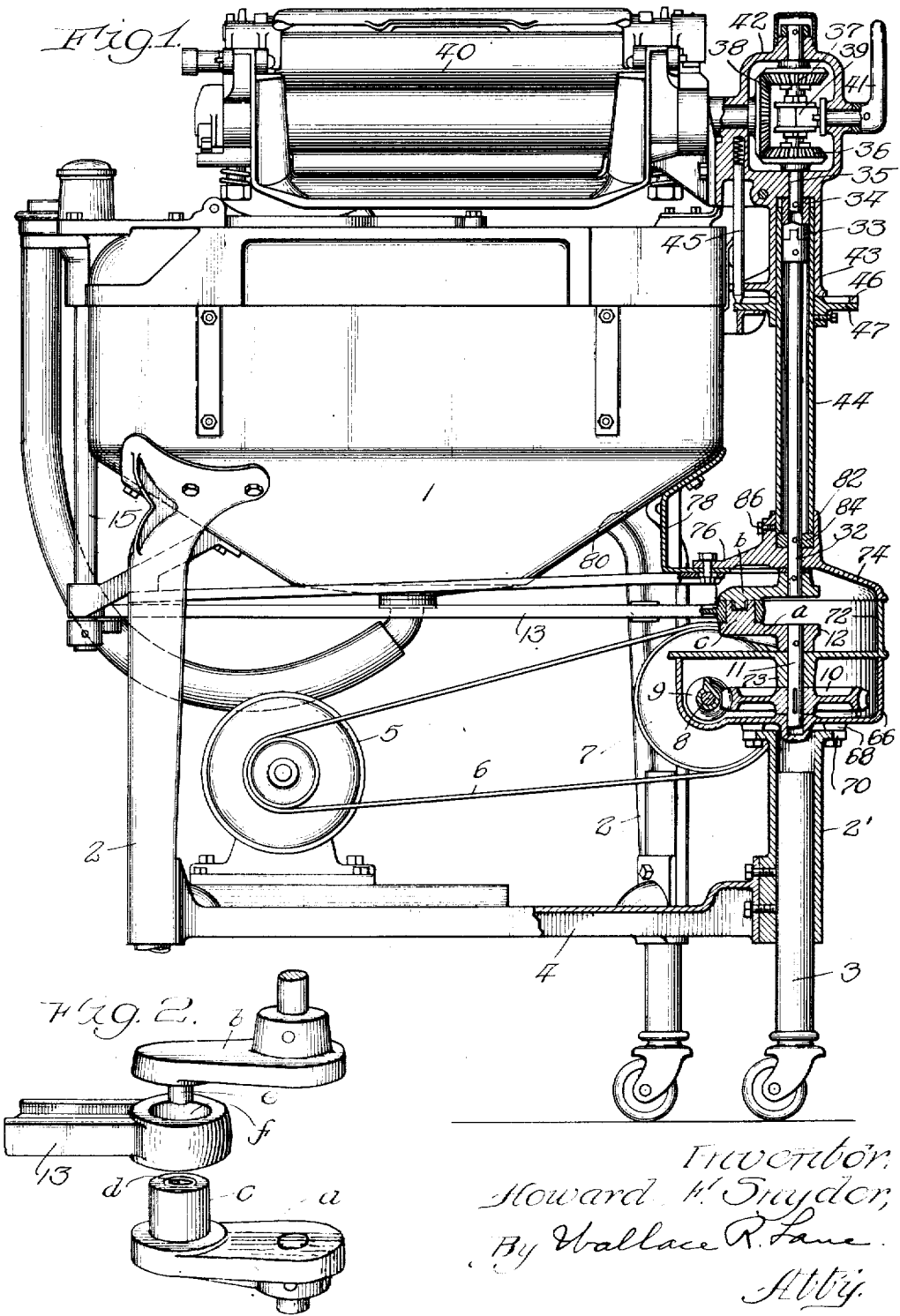

Patented May 5, 1931

1,803,981

UNITED STATES PATENT OFFICE

HOWARD F. SNYDER, OF NEWTON, IOWA, ASSIGNOR TO THE MAYTAG COMPANY, OF NEWTON, IOWA, A CORPORATION OF DELAWARE

DRIVING MECHANISM FOR WASHING MACHINES AND THE LIKE

Original application filed June 16, 1921, Serial No. 477,888. Divided and this application filed July 9, 1927. Serial No. 204,496.

The present invention relates to driving mechanisms, and while of generic application, is particularly adaptable for washing machines.

This application is a division of my pending application Serial No. 477,888, filed June 16, 1921, and a continuation in part of my two pending applications Serial Nos. 568,158, filed June 14, 1922, and 658,076, filed August 18, 1923.

The claims of the present divisional application are directed to the driving mechanism and the gear casings. However, novel features here shown and described, but not claimed, are or will be covered in other applications.

The objects of my present invention are to provide a compactly arranged driving connection appropriately enclosed within a housing for continuously rotating the wringer shaft from the power shaft and for simultaneously oscillating the pitman connecting with the liquid impeller; to provide an improved multi-part casing for such driving connections which, while serving to exclude the dirt and dust, will also permit the free oscillation of the crank and pitman connection from the power shaft; to provide a flexible and detachable driving connection from the spaced ends of two aligned shafts, in the present case, the preferably vertically disposed power and wringer driving shafts; to provide the opposed adjacent ends of such aligned shafts with a detachable crank construction for driving the connecting rod, which oscillates the agitator or any other reciprocable member, whereby the connecting rod may be readily detached from its driving crank; to provide a suitable casing for the power shaft and wringer-drive shaft, the driving gears and connecting cranks, which not only adequately houses these parts, but permits unrestricted oscillation and easy detachment of the connecting rod passing through this casing; to provide a detachable multi-part casing for the foregoing parts which is easily assembled and taken down and to provide the upper portion of such casing with a seat for a tubular casing enclosing the vertically disposed wringer drive shaft.

The above and other features of novelty, advantages and capabilities will become apparent from a detail description of the accompanying drawings, in which I have illustrated one form of my invention.

Fig. 1 is a side elevation of a washing machine with certain parts thereof broken away, and others in section to show the adaptation of my invention thereto; and Fig. 2 is a perspective view with the parts in disassembled relation, of the two part crank connecting the upper and lower shafts, and the connection to the intermediate connecting rod.

Referring to the drawing, the tub 1 is made of aluminum, or the like, and mounted on suitable legs 2. Certain of these legs are directly secured as by rivets, bolts, welding, or otherwise, with the bottom of the tub. One of the legs 2' is offset and is formed relatively short and provided on its upper end with lateral flanges hereinafter described. Secured to and extending between the legs is a platform 4 carrying any suitable form of motor 5, connected by belt 6, or other suitable power transmitting means, to the drive wheel or pulley 7, carried by the shaft 8. This shaft 8 has fixed thereon to rotate therewith the worm pinion 9 meshing with worm gear 10, mounted upon the lower end of a vertical shaft 11.

Fixed to the upper end of shaft 11 is a crank arm 12, and pivotally connected thereto is a rod 13, which rod at its opposite end is pivotally connected to a second crank arm mounted at the lower end of a vertical shaft 15, providing, through suitable rack and pinion connections, an alternating rotary drive for the agitator of the washing machine tub.

The crank 12 is composed of two crank arms $a$ and $b$, one fixed to the upper end of the shaft 11, and the other to the lower end of the vertical wringer drive shaft 32. Crank arm $a$ carried on upstanding pin $c$ for rotatably receiving the adjacent apertured end of the connecting rod 13. Pin $c$ is formed at its upper end with a depression or aperture $d$ for receiving the projection $e$, depending from the crank arm *b*. These interfitting parts cause the two crank arms to rotate together, the arm *a* driving the arm *b*, and at the same time provide a flexible and detachable connection between shafts 11 and the vertical wringer drive shaft 32, which permits ready removal of these parts from the enclosing casing as well as ready assembling of the respective parts.

The wringer drive shaft 32, which is in vertical alinement with shaft 11, has a clutch connection 33 at its upper end to receive the sleeve 34 of the shaft 35, which through the medium of beveled gears 36, 37 and 38 drives the rolls of the wringer 40. Longitudinally slidable on the shaft 35, but rotatable therewith, between gears 36 and 37, is a clutch member 39 provided at its opposite ends with clutch surfaces to respectively engage cooperating clutch surfaces on the inner faces of bevel gears 36 and 37, whereby when clutch 39 is moved longitudinally of shaft 35, to which it is splined, and which movement is effected by the handle 41, the wringer rolls may be rotated in one direction or the other.

Downwardly extending from the gear casing 42 of the wringer is the tubular portion 43, rotatable on the column or tube 44, surrounding shaft 32, by virtue of which the wringer may be readily swung into any desired horizontal position and secured in such position by entry of the rod 45 into the appropriate notch 46 of the outwardly extending collar 47, secured to column 44, and upon which collar is seated the lower end of sleeve 43. As will be readily noted, this construction is such as to enable the wringer to be readily removed from its support by merely raising it vertically from column 44, and, when desired, replaced through reverse operations.

In my present construction I have provided a casing for enclosing the driving connections from the transverse shaft 8, which is driven from the prime mover 5, to the wringer shaft 32 and to the pitman 13, and I have arranged this casing so that it not only encloses the moving parts and excludes the dust and dirt, but also forms a lubricant containing pan or housing for the gears and protects the operator from injury, while at the same time permitting the free oscillation of the pitman connecting the power shaft and the liquid impeller. In addition this casing and the wringer shaft 32 are supported in direct axial alignment with the tub supporting stub leg 3 in such a way as to provide a direct and sturdy support for the bottom of the tub. The casing also provides a direct support for the tubular casing 44 enclosing the wringer shaft 32, which projects upwardly through the casing and connects with the swinging wringer mechanism above the tub. The features of construction whereby the stub leg 3, the casing and vertical wringer shaft are mounted in axial alignment are fully set forth and claimed in another divisional application.

In the present invention my casing is formed of a plurality of parts providing a lower enclosed chamber for holding the gears and lubricant and excluding them from the dirt and dust, and a superimposed chamber which almost wholly encloses the driving crank for the pitman, but which is left sufficiently open or provided with an opening to permit the oscillatory movement of the pitman.

Referring now to the particulars of this construction, the worm gear wheel 10 and the worm pinion 9 are enclosed in a casing 66, which has ears 68 at its bottom bolting to a lateral collar or flange 70 formed on the upper end of the leg 2'. The bottom of this casing 66 is formed with a bearing to receive the lower end of shaft 11. The top of casing 66 is open and is normally closed by the second casing 72, which has a central bearing 73. The base of this casing 72 is in the form of a horizontally disposed plate which closes the top of the lower casing 66. The second casing 72 is provided with an upstanding side which does not extend entirely around the periphery of the casing whereby to provide an opening at one side of the casing so that the connecting rod 13 passing therethrough is free to swing arcuately as the crank 12 is revolved. The open top of the intermediate casing 72 is closed by a top casing 74.

This latter casing is likewise provided with an open side to register with that of the intermediate casing 72 to permit free oscillation of the connecting rod 13. The casing 74 has a lateral extension 76 which bolts to a depending bracket 78 carried by the lower wall 80 of the tub 1. The top of casing 74 is formed with an upstanding circular flange 82 forming a circular seat or well in which is positioned a bearing collar 84 and the lower end of tube 44 for enclosing the shaft 32. These parts are held in position by a fastening member 86 passing through the upstanding flange of the casing 74. In the foregoing manner the worm gearing and cranks and shafts 11 and 32 are completely housed within the casing 66, 72 and 74, which are constructed to permit the free oscillation of the connecting rod 13 by the crank 12, while at the same time permitting the ready removal of the connecting rod from the crank and the facile detachment of the crank arms *a* and *b*. In addition, this multiple part casing provides bearings for the alined two shafts 11 and 32.

Having shown and described my invention, I claim:

1. In combination with two vertically superimposed shafts disposed with their adjacent ends spaced apart, driving gearing for the lower shaft, a detachable crank connecting the ends of the shafts, a connecting rod pivotally mounted on said crank, an open top casing enclosing the lower shaft and its gearing, an open topped intermediate casing having a horizontally disposed plate closing the top of said first casing and provided with a depending boss acting as a bearing for said lower shaft, said intermediate casing having an upstanding wall enclosing the crank and formed with an opening through which the connecting rod passes, an upper casing closing the open top of the intermediate casing and likewise formed with an opening registering with the opening of the intermediate casing to permit free oscillation of the connecting rod.

2. In combination with two vertically superimposed shafts disposed with their adjacent ends spaced apart, driving gearing for the lower shaft, a detachable crank connecting the ends of the shafts, a connecting rod pivotally mounted on said crank, an open top casing enclosing the lower shaft and its gearing, an open topped intermediate casing having a horizontally disposed plate closing the top of said first casing and provided with a depending boss acting as a bearing for said lower shaft, said intermediate casing having an upstanding wall enclosing the crank and formed with an opening through which the connecting rod passes, an upper casing closing the open top of the intermediate casing and likewise formed with an opening registering with the opening of the intermediate casing to permit free oscillation of the connecting rod, said upper casing having an upstanding circular flange forming a seat about the driven shaft and a tube enclosing said shaft and having its lower end bearing within said circular flange.

3. The combination of two aligned shafts with their opposed ends spaced apart, a crank connected to the opposed shafts, a connecting rod pivoted to the crank, drive gearing for one of said shafts and a multipart casing adapted to enclose the shafts, the gearing, and the crank, said casing having an opening to permit the passage therethrough of the connecting rod and to permit its free oscillation, means for supporting said casing, said casing parts having interior bearings for supporting the adjacent ends of the aligned shafts.

4. In a device of the class described, the combination of two vertically aligned shafts having their adjacent opposed ends spaced apart, a crank for connecting said ends, a connecting rod pivotally connected to said crank, a casing enclosing the adjacent ends of said shafts and said crank, the upper portion of said casing having an upstanding circular flange forming a seat with one of said shafts passing concentrically through the circular flange of said casing, and a tubular casing enclosing said projecting shaft with the lower end of the tube resting in said seat.

5. In combination with a support, two vertically aligned shafts having their adjacent opposed ends spaced apart, a crank connecting said ends, a connecting rod pivotally carried by said crank, a casing enclosing the adjacent ends of said shaft and said crank, the upper portion of said casing having an upstanding circular flange forming a seat with one of said shafts passing concentrically through the circular flange of said casing, a tubular casing enclosing said projecting shaft with the lower end of the tube positioned in said seat, a tubular sleeve pivotally mounted on the upper end of said tubular casing and carrying mechanism to be swung in a horizontal plane, the upper end of said tubular casing and tubular collar housing the upper end of said upwardly projecting shaft, and driving mechanism from said shaft to the mechanism carried by said tubular sleeve.

6. In a washing machine the combination with a tub having a liquid impeller therein, legs for supporting said tub, a bracket mounted on said legs, a prime mover mounted on said bracket, a casing mounted on one of said legs, a transverse shaft mounted in said casing and driven by said prime mover, two vertical shafts mounted in said casing, a pitman projecting through an opening in said casing and connected to the liquid impeller, driving connections in said casing for rotating one of the shafts from the other and for oscillating said pitman, one of said shafts extending through said casing vertically upwardly alongside the tub, a wringer mounted on said tub and operatively connected to said vertical shaft, and a tubular casing supported by said first mentioned casing and enclosing said vertical shaft.

7. In a washing machine the combination with a tub having a liquid impeller therein, legs for supporting the tub, certain of said legs having their upper portions directly connected to the body of the tub and one of said legs being relatively short and provided with an upper flange, a bracket mounted between the lower part of said legs, a prime mover on said bracket, a casing mounted on the flange of the short leg, a transverse shaft mounted in said casing and driven by said prime mover, two vertical shafts mounted in said casing, a pitman projecting for oscillation through an opening in said casing and connected to the liquid impeller, driving connections in said casing for rotating one of the shafts from the other and for oscillating said pitman, the driven shaft extending through said casing vertically upwardly alongside the tub, a bracket mounted on the tub wall and connected to the upper part of the casing, a wringer mounted on said tub and operatively connected to said vertical shaft, and a tubular casing supported by said first mentioned casing and the upper portion of the tub and enclosing said vertical shaft.

8. In a washing machine the combination with a tub having a liquid impeller therein, a support for said tub, a lower casing part mounted on said support and having an open top and a bearing, a second casing part having an open top and provided with a plate closing the top of said first casing part and provided with an apertured bearing, transverse and vertical shafts and interconnecting gears therefor enclosed by said first and second casing parts with the vertical shaft mounted in the bearings thereof and projecting through the apertured bearing of the second casing part, a prime mover for driving said transverse shaft, said second casing part having an opening in the side thereof adjacent the tub and a third casing part mounted on said second casing part and forming a top therefor, said third casing part having an opening in its side registering with the opening in the second casing part, a crank on the upper end of the vertical shaft, a pitman connected thereto and projecting through the opening formed in the second and third casing parts to permit the pitman freely to oscillate, and a driving connection from the pitman to the liquid impeller in the tub.

9. In a washing machine the combination with a tub having a liquid impelling agitator therein, legs for supporting said tub, a bracket mounted on said legs, a prime mover mounted on said bracket, a lower open-top casing part mounted on one of said legs, a transverse shaft therein, a driving connection from the prime mover to said transverse shaft, a vertical shaft having a bearing in said casing, a second casing part having a plate closing the top of said first casing part and provided with an apertured bearing for the projection therethrough of the vertical shaft, said second casing part having an upstanding flange extending part way around its outer edge but being absent at the side adjacent the tub body, a third casing part mounted on top of the second casing part to partly close the top of the latter, said third casing part having a depending annular flange extending part way around the periphery of the casing part but being absent at the portion adjacent the tub to provide an opening registering with the opening in the upstanding flange of the second casing part, a crank on the upper end of the vertical shaft, a connecting rod connected to said crank and projecting for oscillation through the opening formed by the openings in the flanges of the second and third casing parts and said rod having an operative connection to the agitator within the tub.

10. In a driving mechanism of the character described, a driving shaft, a driven shaft in axial alignment with the driving shaft, and crank arms on the adjacent ends of said shafts and having engagement with each other at their free ends so that actuation of the driving shaft will operate said driven shaft.

11. In a driving mechanism of the character described, a driving shaft, a driven shaft in axial alignment with the driving shaft but separated therefrom, crank arms on the adjacent ends of the respective shafts, said crank arms being provided with free ends having complemental interfitting parts so that actuation of the driving shaft will operate the driven shaft, a connecting rod engaging the interfitting ends of said crank arms, and a second driven shaft actuated by said connecting rod.

12. In a driving mechanism of the character described, a driving shaft, a driven shaft, said shafts being in axial alignment but having their adjacent ends spaced apart, crank arms on the adjacent ends of the respective shafts, one of said crank arms having a crank pin apertured at one end, the other crank arm having a projection complemental to and normally engaging the aperture of said crank pin, so that actuation of the driving shaft will operate the driven shaft.

13. In a driving mechanism of the character described, a driving shaft, a driven shaft, said shafts being in axial alignment but having their adjacent ends spaced apart, crank arms on the adjacent ends of the respective shafts, one of said crank arms having a crank pin apertured at one end, the other crank arm having a projection complemental to and normally engaging the aperture of said crank pin, so that actuation of the driving shaft will operate the driven shaft, a connecting rod engaging said crank pin, and a second driven shaft actuated by said connecting rod.

14. In a driving mechanism of the character described, two vertically disposed aligned shafts having their adjacent ends spaced apart, crank arms on the respective spaced apart ends of said shafts and having engagement with each other so that rotation of one shaft will operate the other shaft, and means independent of the crank arms for rotating the first mentioned shaft.

15. The combination with a driving shaft and a driven shaft in axial alignment but spaced apart at their adjacent ends, and crank arms connecting the spaced apart ends of said arms connecting the spaced apart ends of said shaft so that actuation of the driving shaft will operate the driven shaft, of a casing provided with a bearing for said shaft, and a top casing superposed on the first casing, said casings having registering openings to provide clearance for said crank arms during rotation of said shafts.

16. The combination with a driving shaft and a driven shaft in axial alignment but spaced apart at their adjacent ends, crank arms connecting the spaced apart ends of said shaft so that actuation of the driving shaft will operate the driven shaft; a connecting rod engaging said crank arms, and a second driven shaft actuated by said connecting rod, of a casing provided with a bearing for said shaft, and a top casing superposed on the first casing, said casings having registering openings to provide clearance for said crank arms and said connecting rod.

17. In a driving mechanism of the character described, a driving shaft, a driven shaft in axial alignment with the driving shaft but supported therefrom, crank arms on the adjacent ends of the respective shafts, the free end of one crank arm having a bearing pin projecting therefrom and provided with a longitudinal recess, a connecting rod having a bearing movably engaging said bearing pin, the other crank arm having a pin complemental to said recess so that actuation of the driving shaft will operate the driven shaft and the connecting rod simultaneously, and a second driven shaft operated by said connecting rod.

In witness whereof I hereunto subscribe my name to this specification.

HOWARD F. SNYDER.

shaft so that actuation of the driving shaft will operate the driven shaft; a connecting rod engaging said crank arms, and a second driven shaft actuated by said connecting rod, of a casing provided with a bearing for said shaft, and a top casing superposed on the first casing, said casings having registering openings to provide clearance for said crank arms and said connecting rod.

17. In a driving mechanism of the character described, a driving shaft, a driven shaft in axial alignment with the driving shaft but supported therefrom, crank arms on the adjacent ends of the respective shafts, the free end of one crank arm having a bearing pin projecting therefrom and provided with a longitudinal recess, a connecting rod having a bearing movably engaging said bearing pin, the other crank arm having a pin complemental to said recess so that actuation of the driving shaft will operate the driven shaft and the connecting rod simultaneously, and a second driven shaft operated by said connecting rod.

In witness whereof I hereunto subscribe my name to this specification.

HOWARD F. SNYDER.

CERTIFICATE OF CORRECTION.

Patent No. 1,803,981.   Granted May 5, 1931, to

HOWARD F. SNYDER.

It is hereby certified that error appears in the printed specification of the above numbered patent requiring correction as follows: Page 1, line 96, for "carried on" read carries an; and that the said Letters Patent should be read with this correction therein that the same may conform to the record of the case in the Patent Office.

Signed and sealed this 6th day of October, A. D. 1931.

(Seal)

M. J. Moore,
Acting Commissioner of Patents.

CERTIFICATE OF CORRECTION.

Patent No. 1,803,981.                      Granted May 5, 1931, to

HOWARD F. SNYDER.

It is hereby certified that error appears in the printed specification of the above numbered patent requiring correction as follows: Page 1, line 96, for "carried on" read carries an; and that the said Letters Patent should be read with this correction therein that the same may conform to the record of the case in the Patent Office.

Signed and sealed this 6th day of October, A. D. 1931.

(Seal)                                                M. J. Moore,
                                                   Acting Commissioner of Patents.